United States Patent
Totzke

Patent Number: 5,579,309
Date of Patent: Nov. 26, 1996

[54] OBJECT ORIENTED PROGRAM-CONTROLLED BROADBAND COMMUNICATION EQUIPMENT FOR OPTIMIZED METHOD CALLS

[75] Inventor: Juergen Totzke, Poing, Germany

[73] Assignee: Siemens Aktiengesellschaft, Munich, Germany

[21] Appl. No.: 428,430

[22] Filed: Apr. 25, 1995

[30] Foreign Application Priority Data

Apr. 29, 1994 [DE] Germany ............... 44 15 172.1

[51] Int. Cl.$^6$ .................. H04J 3/12; H04Q 11/04; G06F 9/44

[52] U.S. Cl. ............. 370/58.2; 370/68.1; 370/110.1; 395/200.13; 395/683

[58] Field of Search ................. 370/58.1, 58.2, 370/58.3, 60, 60.1, 62, 68.1, 94.1, 110.1; 379/93, 94, 157, 165, 202; 395/200, 325, 500, 725, 800, 375, 650

[56] References Cited

U.S. PATENT DOCUMENTS 5,307,347  4/1994  Duault et al. ................. 370/110.1
5,434,852  7/1995  La Porta et al. ............... 370/58.2

FOREIGN PATENT DOCUMENTS

0589249A2  8/1993  European Pat. Off. .
WO93/20509  3/1993  WIPO .

*Primary Examiner*—Alpus H. Hsu
*Attorney, Agent, or Firm*—Hill, Steadman & Simpson

[57] ABSTRACT

A switching-oriented process sequencing according to the principle of object-oriented program includes a plurality of object-related structure elements for the implementation of different switching-oriented functions. Objects for the realization of specific switching-oriented functions are instanced by these structure elements, these objects communicating with one another by method calls. It is thereby provided that the network layer for the subscriber signaling defined according to the OSI-7 layer model is subdivided into a plurality of sub-layers. Each of these sub-layers is realized by a structure element hierarchy including at least one structure element. The calling and called subscriber side defined for the subscriber signaling is represented in each structure element of the respective structure element hierarchy by at least one separate object. Objects of one and the same subscriber side thereby communicate directly with one another via quasi-asynchronous method calls, whereas objects of the respective sub-layer of different subscriber sides communicate directly with one another via asynchronous internal events.

6 Claims, 2 Drawing Sheets 5,579,309

OBJECT ORIENTED PROGRAM-CONTROLLED BROADBAND COMMUNICATION EQUIPMENT FOR OPTIMIZED METHOD CALLS

BACKGROUND OF THE INVENTION

The present invention is directed to program-controlled communication equipment and, more particularly, the present invention relates to a broadband ISDN communication equipment. Program-controlled equipment in the related art is described, for example, in application number WO 93/20 509. In this known device, an object-oriented program module is provided for handling dialed connections. According to the principle of object-oriented programming, classes, which are also referred to as structure elements below, are defined in this program module. Objects of the classes are instantiated for execution of specific switching-oriented functions. These objects present a data encapsulation to the outside and are comprised of a unit of data and program procedures that are also referred to as methods.

General information regarding object-oriented programming and the rules thereof may be derived, for example, from B. Meyer, "Object Oriented Software Construction", Prentice Hall, Englewood Cliffs, N.Y. [sic], 1988 or from B. Fraunheim et al., "Objektorientierte Programmierung" (C++ Programming Course, Part I-Part IV, Elektronik 1990, Nos. 22–25).

In the program-controlled equipment disclosed by application number WO 93/20 509, the objects belonging to the switching-oriented program module communicate with one another via method calls. The objects thereby logically form a call chain. The call sequence is strictly sequential. An asynchronously delivered, external event (for example, a call signal) must run through the entire method call chain until the terminating object is reached. System reactions to this external event run through the entire method call chain in reverse sequence.

With respect to object orientation, this represents a solution that is not optimum because some objects execute methods without influencing the data contained in them merely so that the call chain is not interrupted. It is thus an object of the present invention to disclose a method for reducing the number of method calls for an external signal in a program-controlled equipment. In the program-controlled equipment of the present invention, the complexity of the individual structure elements within the switching-oriented process is reduced and the throughput of the program-controlled equipment is enhanced. This is particularly critical for a broadband ISDN communication equipment.

The present invention shall now be set forth in greater detail by way of example below with reference to drawings.

SUMMARY OF THE INVENTION

A broadband ISDN communication equipment is discussed below as an example of the program-controlled equipment of the present invention. At least one switching-oriented process is capable of running therein in order to control the procedures required by this communication equipment during the course of setup and cleardown of switched connections and in order to realize the subscriber signaling protocols defined for these switched connections. Such subscriber signaling protocols for ATM connections (asynchronous transfer mode) are defined by the ITU-T recommendation Q.2931 or, respectively, by "ATM Forum UNI Spezifikation, Version 3, Chapter 5, UNI Signaling" for the network layer (layer 3) according to the OSI-7 layer model.

Figure 1:
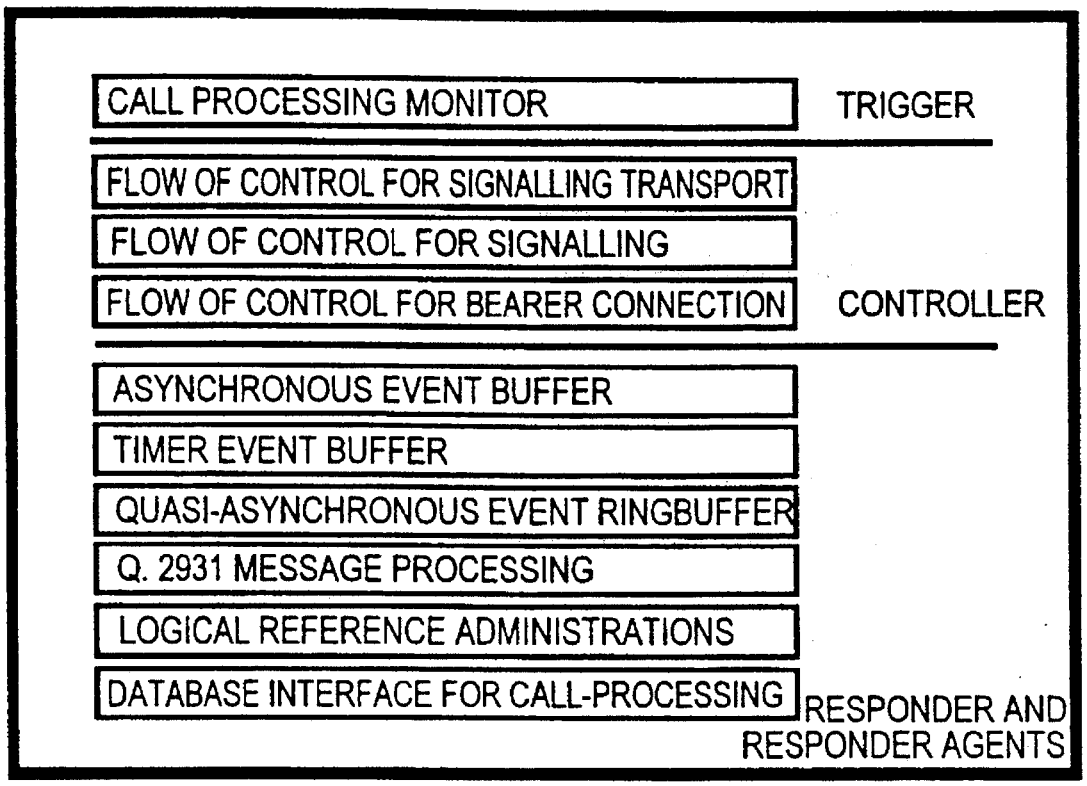
FIG. 1 illustrates the class structure of a switching-oriented process.

FIG. 1 schematically illustrates the class structure of the switching-oriented process set forth below. As already disclosed in European patent application EP 0 589 249 A2, a program module—(a switching-oriented program module in this case—) can be subdivided into four layers corresponding to the objects provided therein. The four layers are respectively referred to as trigger, controller, responder agent and responder layer. The trigger layer forms the interface of the program module with the operating system and converts external events into information that can be internally processed. The controller layer contains the switching-oriented flow of control logic, whereas the data base organization of all data required for the execution of the program module is undertaken in the responder agent layer and in the responder layer. Allowable communication relationships between individual objects can thereby be defined, as set forth in the above-referenced European patent application.

The call processing monitor recited in the trigger layer receives asynchronous, external event information and information with respect to timeouts to which reactions must be made within the switching-oriented process. External event information is stored in a buffer (asynchronous event buffer) for the purpose of storing asynchronous events and further processing within the responder agent layer and responder layer. By contrast thereto, information with respect to a timeout is deposited in a timer event buffer. External event information is thereby either change in status indications of the link layer (layer 2) or signaling messages of the network layer (layer 3) (Q.2931 messages)from the respective subscribers according to the above-mentioned OSI-7 layer model. The signaling messages are thereby further-processed by a class referenced "Q.2931 message processing". The call processing monitor thereby converts the respective external event information into an internal event code and forwards this to the corresponding controller. To that end, logical references related to this event code must be converted into the memory addresses of the objects considered for processing. They converted with the assistance of logical reference administrations of the responder agent layer and responder layer. In order to seize system resources for call setup, a data base interface for call processing is required within the responder agent layer and responder layer for access to the data base of the communication equipment.

In FIG. 1, flow of control logic for signaling), flow control for signaling)flow of control logic for the service access point to the link layer (flow control for signaling transport) as well as flow of control logic for a Bearer connection (flow control for bearer connection) are located in the controller layer. The latter is employed for the switching of a bearer connection and controls the peripheral units (line termination units) of the communication equipment. Only the flow of control logic for the signaling and for the service access point to the link layer are discussed in greater detail below.

Figure 2:
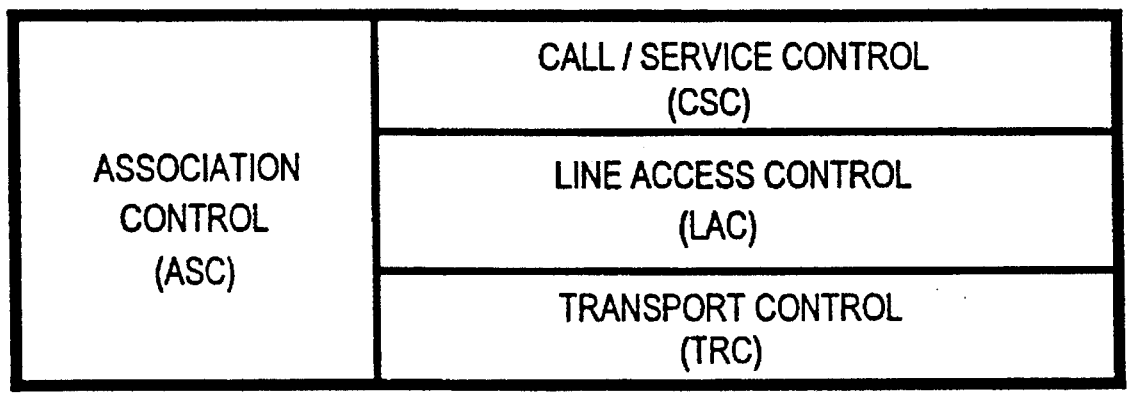
FIG. 2 illustrates the subdivision of the network layer provided within the switching-oriented process.

In FIG. 2, the network layer formed by the flow of control logic for signaling and for the service access point to the link layer is subdivided into three sub-layers. These three sub-layers are: 1) a line access control LAC for control of the declared subscriber signaling protocol; 2) a call/service control CSC that controls internal executions of the equipment; and 3) a transport control TRC. The service access point for status changes of the link layer (layer 2) is thereby handled by the transport control. This transport control controls communication at the interface of layer 3 and layer 2. An association control, ASC, in the form of a signal distributor is embedded in the call processing monitor and serves as link for these sub-layers.

Each of sub-layers, LAC and CSC, is realized in a class hierarchy. In every class of the respective class hierarchy, the calling subscriber side and called subscriber side defined for subscriber signaling is represented by at least one separate object. The objects thereby communicate locally at one of the subscriber sides directly via quasi-asynchronous method calls (a method queue). The communication as seen from the point of view of the individual object thus ensues asynchronously but the method calls are sequentially delivered. The respective destination object is indicated by a physical object address (memory address) with the respective method call that is forwarded in the form of a signal with parameters which the respective destination object can directly access. In contrast thereto, objects of different subscriber sides (calling and called subscriber side) communicate with one another via asynchronous internal events ("reports"), whereby the respective destination object is addressed by a logical object address.

An internal event ("report") thereby represents a specific data structure without direct access to parameters. The communication relationships of the objects in two typical switching-oriented sequences will now be discussed below with reference to FIGS. 3 and 4.

A signaling message from the operating system of the broadband ISDN communication equipment is supplied to the switching-oriented process via what is referred to as a service access point, supplied with "primitive" information with layer-three portion ("protocol data unit"). The call processing monitor (FIG. 1 ) stores the event information and identifies the event type. The event information is converted into an internal event indicator with the association control, ASC, that is embedded in the call processing monitor and which controls the execution of the protocol procedure. The association control, ASC, thereby converts the logical reference present in the event information into a physical object reference. It addresses the destination object in this way and delivers the event information to the latter for processing. This method is employed for change in status indications of the link layer (layer 2), for reception of signaling messages and for internal events between the two subscriber sides (calling and call subscriber side) of a call or for timeout indications.

Figure 3:
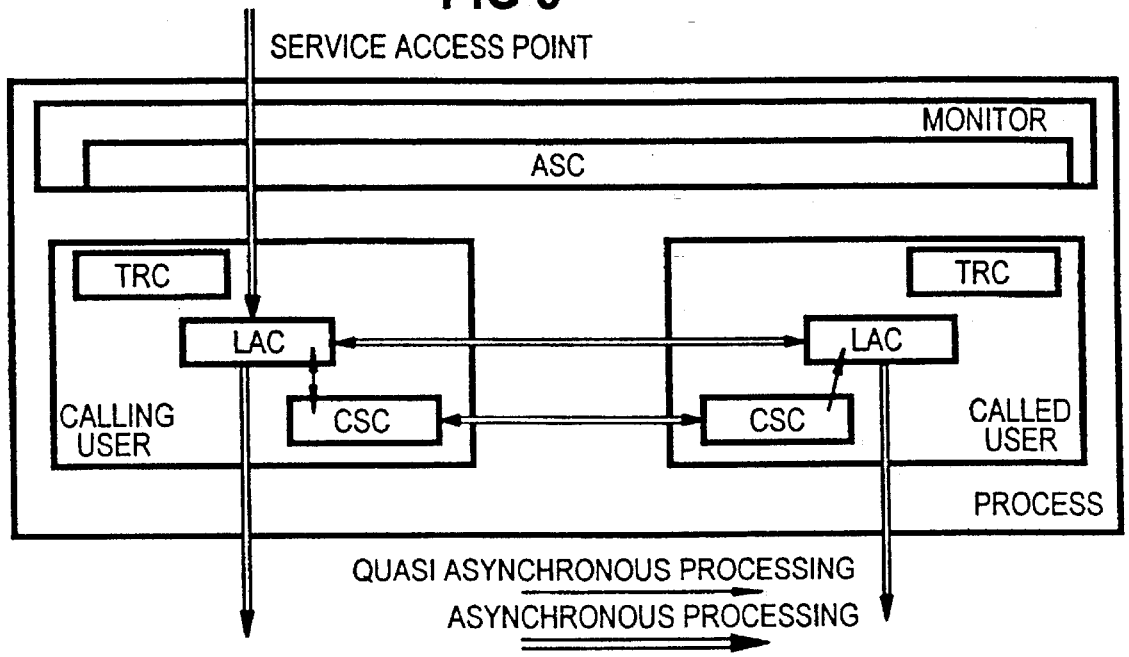
FIG. 3 illustrates an exemplary embodiment for communication of objects of the switching-oriented process.

FIG. 3 shows typical handling of a signaling message (Q.2931 message). As a logical reference, this contains what is referred to as a call reference. By conversion of this logical reference, the corresponding destination object of the line access control, LAC, is identified by association control, ASC, and the event information is delivered to this destination object. For a call to be newly handled, the association control ASC may previously instantiate a new object of the line access control. This line access control then processes the event information according to the protocol Q.2931 with the aid of the class "Q.2931 message processing" shown in FIG. 1. For specific tasks within the communication equipment that are protocol-neutral, such as, for example, authorization checks, routing for determining a destination subscriber, seizing of internal resources, administration and assigning of visual channel numbers for visual connections proceeding via the communication equipment, capacity administration of the individual links, etc., the line access control, LAC, directly references the call/service control, CSC, of the same subscriber side via a physical object addresses. A method call occurs between objects of these two controls, whereby the respective method call ensues on the basis of signals containing parameters which the respective destination object can directly access. Additionally, signaling messages having end-to-end significance, i.e. signaling messages that are relevant for both subscriber sides, are forwarded by the respective object of the line access control, LAC, to the respective LAC partner object at the other subscriber side as internal events ("reports"), namely with logical addressing of the destination object of the line access control, LAC, that comes into consideration for this signaling message. This communication thereby may ensue before the output of an acknowledge signal to the subscriber for the call to be handled at the moment in case such an acknowledge information is provided within the protocol procedure.

A necessary, system-internal exchange of information between the calling subscriber side and the called subscriber side of a call ensues directly via the exchange of reports between objects of the call/services control CSC of the two subscriber sides. This information, for example, can thereby be a request or, respectively, (acknowledgement of the through-connection for a bearer connection. Alternatively, it may be a request or, respectively an acknowledge for cleardown of a bearer connection, a call abort or it can be a matter of information with respect to a required synchronization of the call/services controls, CSC, of the two subscriber sides given call aborts for the release of logical resources.

What is referred to as a call identifier (call-ID) is provided for logical addressing of the objects of the call/services controls, CSC. The delivery of reports ensues from an object of the call/services control, CSC, of one of the subscriber sides directly to the destination object of the call/services control, CSC, of the other subscriber side via the association control, ASC. The logical reference that is initially present is thereby converted into a physical object reference. The exchange of end-to-end signaling messages between the objects of the line access controls, LAC, participating in a call and the exchange of internal information between objects of the call/services controls, CSC, is thereby parallelized. For specific situations, when physical resources are to be released by one of the call/services controls and this release is to be signaled from the line access control of the same subscriber side to a subscriber coming into consideration, a synchronization of the information flows between objects of the line access controls and of the call/services controls is necessary. For this purpose, a synchronization point is set in the object of the respective line access control. This synchronization point must be reached via an allocated object of the call/services control of the same subscriber side.

The interface between the line access control, LAC, and the call/services control, CSC, of a subscriber side is composed of protocol-independent primitives. The realization of different protocols or protocol versions is thus possible. The recognition of the respective protocol can be implemented in the association control, ASC.

Figure 4:
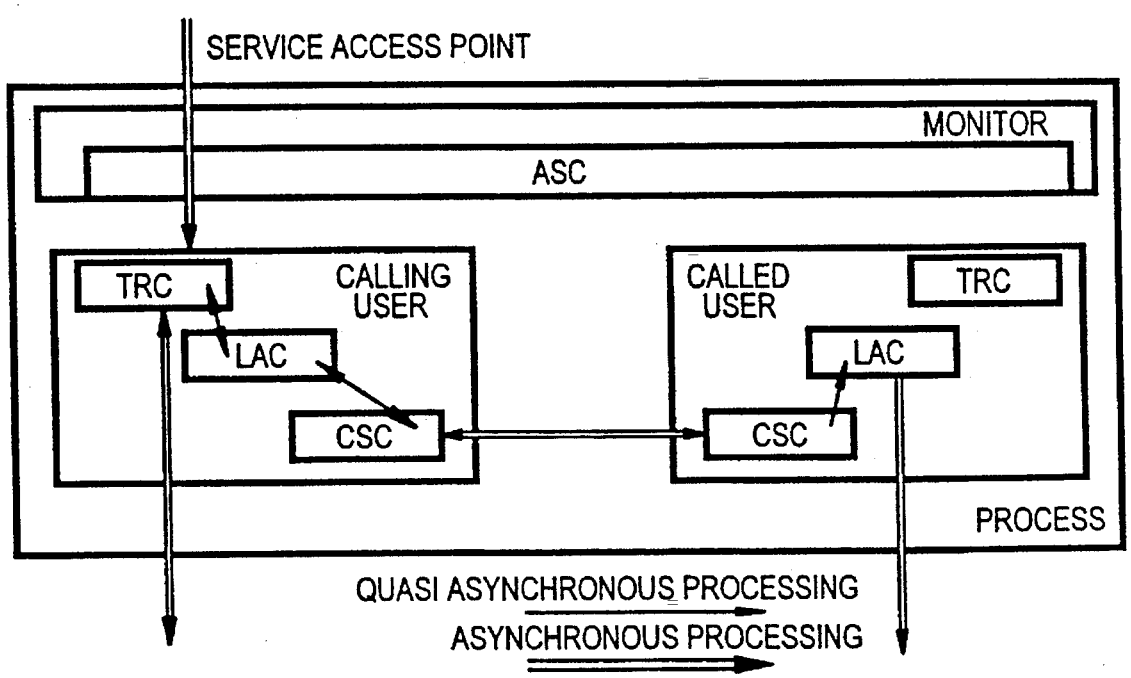
FIG. 4 illustrates an exemplary embodiment for communication of objects of the switching-oriented process.

FIG. 4 illustrates an example of handling information appearing at the service access point with respect to the status change in the link layer (layer 2). The processing of this information ensues with the above-mentioned transport control TRC (FIG. 2). Since the processing of this information has only local significance, no communication occurs between the transport controls of the two subscriber sides. However, communication between objects of the transport control, TRC, and the line access control, LAC, and also between objects of the line access control and the call/services control, CSC, can occur at the respective subscriber side. Additionally, objects of the call/services controls, CSC, of the two subscriber sides can directly communicate with one another in order to perform a call cleardown initiated proceeding from the communication equipment, for example, due to failure of the signaling connection to the respective subscribers or due to protocol violations on the part of one of the subscribers. The calling subscriber side and the called subscriber side are thereby independent of one another in a protocol-conforming call termination after reaching the above-mentioned synchronization point.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim:

1. A communication equipment comprising:

means for controlling the communication equipment with at least one object-oriented switching process, the at least one switching process comprising a plurality of object-related structure elements for implementing different switching-oriented functions respectively available for a plurality of switching procedures, said means for controlling further comprising means for instantiating objects by the structure elements for realizing specific switching functions and wherein the objects communicate with one another by method calls, wherein a network layer for subscriber signaling is comprised of a plurality of sub-layers; each of the sub-layers having a structure element hierarchy comprising at least one structure element; and wherein a calling subscriber side and a called subscriber side are represented in every structure element of the respective structure element hierarchy by at least one separate object; and wherein objects of a same subscriber side communicate directly with one another via select ones of said method calls and objects from different subscriber sides communicate directly with one another via asynchronous internal events.

2. The communication equipment of claim 1, wherein a destination object is addressed by a physical object address with a method call and by a logical reference with an internal event.

3. The communication equipment of claim 1, wherein the network layer is further comprised of a line access control sub-layer for controlling a defined subscriber signaling protocol; a call/services control sub-layer for controlling internal executions of the equipment, a transport control sub-layer for processing status changes of the link layer, and an association control sub-layer linking the sub-layers.

4. The communication equipment of claim 3, wherein internal events between objects of the line access control, sub-layer and of the call/service control sub-layer are initiated in parallel.

5. The communication equipment of claim 4, wherein information flows between objects of the line access control for the call/service control, respectively, via internal events initiated in parallel which are synchronized by the line access control.

6. The communication equipment of claim 1, wherein method calls between objects of the line access control and the call/services control are independent from a subscriber signaling protocol.

* * * * *